United States Patent [19]
Ohshima et al.

[11] Patent Number: 5,587,141
[45] Date of Patent: Dec. 24, 1996

[54] METHOD AND DEVICE FOR THE PRODUCTION OF FULLERENES

[75] Inventors: Satoshi Ohshima, Abiko; Motoo Yumura, Tsukuba; Yasunori Kuriki, Tsukuba; Kunio Uchida, Tsukuba; Fumikazu Ikazaki, Tsukuba, all of Japan

[73] Assignee: Director-General of Industrial Science and Technology, Japan

[21] Appl. No.: 387,253

[22] Filed: Feb. 13, 1995

[30] Foreign Application Priority Data

Feb. 25, 1994 [JP] Japan ................................. 6-053290

[51] Int. Cl.$^6$ ............................. C01B 31/02; B01J 19/08
[52] U.S. Cl. .................. 423/445 B; 423/460; 423/461; 422/186.21; 422/186.22; 422/186.28; 204/173
[58] Field of Search ................... 422/186.21, 186.22, 422/186.26, 186.27, 186.28; 423/445 B, DIG. 40, DIG. 39, 460, 461; 204/173

[56] References Cited

U.S. PATENT DOCUMENTS

| | | | |
|---|---|---|---|
| 5,227,038 | 7/1993 | Smalley et al. | 204/173 |
| 5,300,203 | 4/1994 | Smalley | 204/157.41 |
| 5,304,366 | 4/1994 | Lorents et al. | 423/445 B |
| 5,316,636 | 5/1994 | Bunshah et al. | 204/157.47 |
| 5,393,955 | 2/1995 | Simmons | 219/121.59 |
| 5,395,496 | 3/1995 | Tsantrizus et al. | 204/173 |

*Primary Examiner*—Nina Bhat
*Attorney, Agent, or Firm*—Lorusso & Loud

[57] ABSTRACT

Soot containing fullerenes is produced by impressing a DC voltage between a carbonaceous anode and a cathode in an airtight chamber maintained in an inert gas atmosphere to cause arc discharge to occur. After termination of the impression of the DC voltage, an inert gas is blown into the chamber to fluidize the soot. The fluidized soot is discharged from the chamber and is brought into contact with a solvent to recover the fullerenes.

13 Claims, 2 Drawing Sheets

FIG. I

METHOD AND DEVICE FOR THE PRODUCTION OF FULLERENES

BACKGROUND OF THE INVENTION

This invention relates to a method of producing fullerenes and to a device therefor.

Fullerenes are recently discovered carbon molecules. One method for the preparation of fullerenes is disclosed in Nature, 347, 354 (1990) by Kratschmer et al. In this method, a graphite rod is heated in an atmosphere of helium gas at 100 Torr to form soot, from which fullerenes are extracted with benzene. In another method, a DC potential is applied between a pair of graphite rods disposed in a reaction vessel maintained in an inert gas atmosphere, so that an arc discharge occurs with the simultaneous formation of soot, from which fullerenes are isolated by chromatography (Kikuchi et al, Chem. Lett., 9, 1607 (1991)).

Since fullerene-containing soot is dangerous to human bodies and since fullerenes are apt to be decomposed or deteriorated by contact with oxygen, a care should be taken in handling the soot. In this respect the known methods have a problem when practiced on a large scale.

SUMMARY OF THE INVENTION

It is an object of the present invention to provide a method which permits easy collection of soot and effective recovery of fullerenes.

Another object of the present invention is to provide a method of the above-mentioned type which can recover fullerenes while preventing the oxidation thereof.

It is a further object of the present invention to provide a device useful for carrying out the above method.

In accomplishing the foregoing objects, the present invention provides a method of a method of producing fullerenes, comprising the steps of:

(a) disposing an axially extending rod-like carbonaceous anode having a tip end surface and a cathode having a cathode surface in an airtight chamber such that said tip end surface faces on said cathode surface;

(b) impressing a direct current voltage between said anode and said cathode while maintaining said chamber in the atmosphere of a first inert gas to cause an arc discharge to occur therebetween, so that soot containing fullerenes are accumulated in said chamber;

(c) then, after termination of step (b), blowing a second inert gas on said accumulated soot to fluidize same;

(d) discharging said fluidized soot from said chamber; and (e) introducing said discharged soot into a liquid containing a solvent capable of dissolving fullerenes, thereby to recover the fullerenes.

In another aspect, the present invention provides a device for producing fullerenes, comprising:

an airtight chamber;

an axially extending rod-like carbonaceous anode having a tip end surface;

a cathode having a cathode surface;

means for feeding a first inert gas to said chamber;

means for supporting said cathode such that said cathode surface thereof is positioned within said chamber;

means for supporting said anode such that said tip end surface is positioned within said chamber and faces on said cathode surface with the axis of said rod-like anode being oriented in the direction normal to said cathode surface;

control means for controlling the distance between said tip end surface and said cathode surface;

means for impressing a direct current voltage between said anode and said cathode, so that an arc discharge occurs between said tip end surface of said anode upon impression of the direct current voltage therebetween and soot containing fullerenes is accumulated in said chamber;

blowing means for blowing a second inert gas on said accumulated soot to fluidize said soot;

a recovery zone containing a solvent capable of dissolving fullerenes; and means extending between said chamber and said recovery zone to introduce said fluidized soot into said solvent, whereby said fullerenes contained in said soot are recovered in said solvent.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
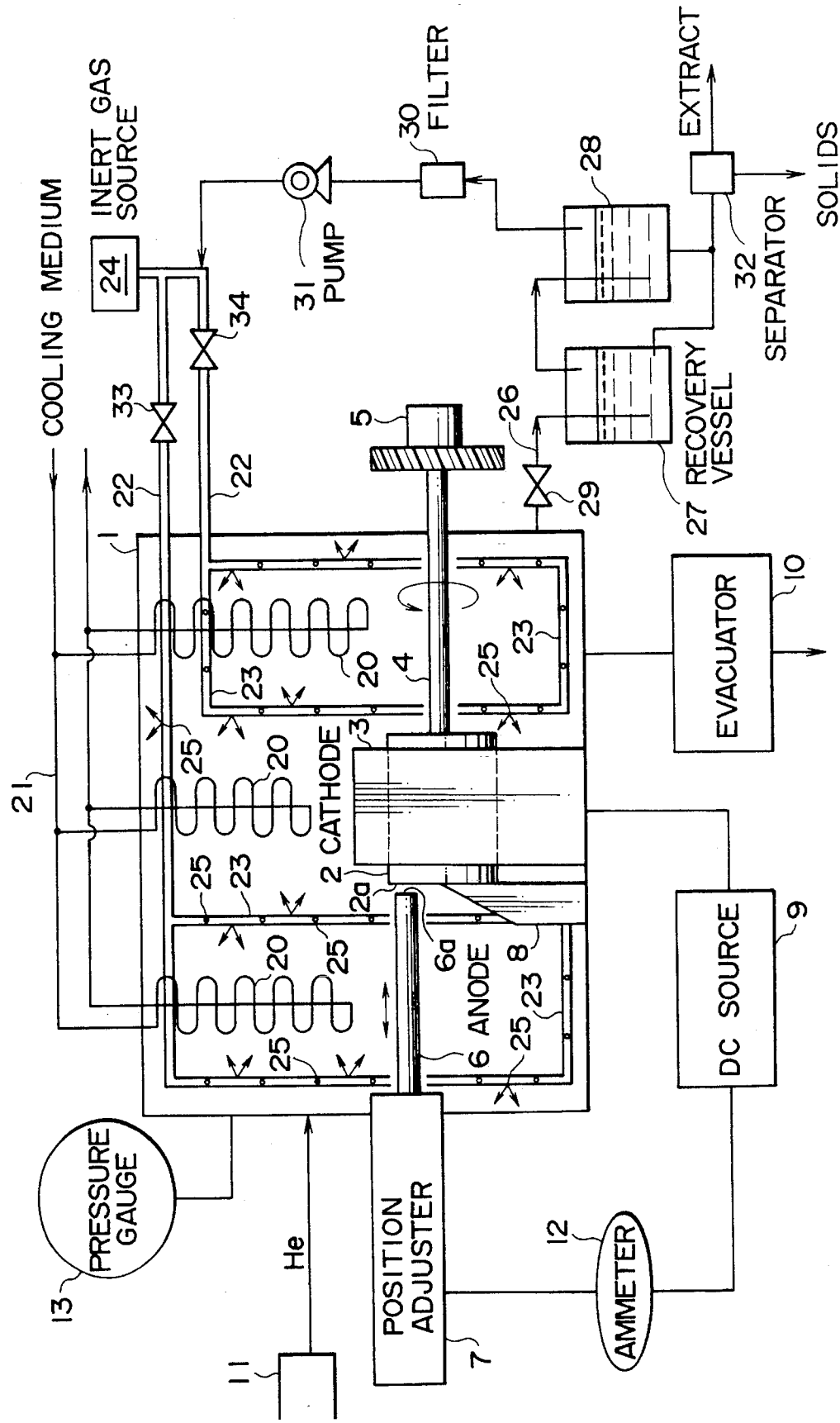
FIG. 1 is a schematic illustration of a device for the production of fullerenes according to the present invention.
Figure 2:
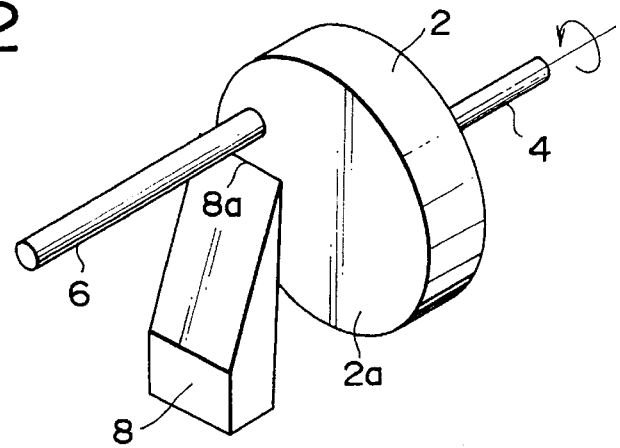
FIG. 2 is a schematic illustration of the arrangement of an anode, a cathode and a blade in the device of FIG. 1.

Referring to FIGS. 1 and 2, designated as 1 is an airtight chamber in which an arc discharge is to be carried out. An axially extending rod-like anode 6 having a tip end surface 6a is horizontally disposed within the chamber 1. The anode 6 is formed of a carbonaceous material such as carbon, graphite or metal-containing graphite. The metal of the metal-containing graphite may be, for example, copper, iron or cobalt. The diameter of the anode 6 is generally 5–30 mm, preferably 8–15 mm. The anode 6 is supported by a holder (not shown) which in turn is connected to a position adjuster 7. The position adjuster 7 is operated manually or automatically to axially displace the anode 6 so as to position the tip end surface 6a thereof at a desired location. The holder is electrically connected to a positive pole of a direct current source 9 through an ammeter 12.

A cathode 2 having a cathode surface 2a is also disposed within the chamber 1 such that the cathode surface 2a is oriented normal to the axis of the rod-like anode 6. It is preferred that the area of the cathode surface 2a is larger than that of the tip end surface 6a of the anode 6. Preferably, the cathode surface 2a is at least 4 times as large as the tip end surface 6a. The cathode 2, which is formed of a heat-resisting conductive material such as a metal, e.g. copper, or a carbonaceous material such as carbon, graphite or metal-containing graphite, is in the form of a cylinder whose axis is oriented in parallel with the axis of the anode 6 but is departed from the axis of anode 6.

Designated as 3 is a support member fixed within the chamber 1 and having a hole in which the cylindrical cathode 2 is rotatably received such that the axis of the cathode 2 serves as the center of rotation thereof. The support member 3 is made of a conductive member and is electrically contacted with the cathode 2. The support member 3 is coupled to a negative pole of the direct current source 9.

The cylindrical cathode 2 has an end surface which is opposite to the cathode surface 2a and to which a coaxial, electrically insulating shaft 4 is secured for rotation with the cathode 2. The shaft 4 extends out of the chamber 1 and is connected to a driving mechanism 5 including an electric motor for rotating the shaft 4.

As a result of the above construction, by mounting the rod-like anode 6 on the holder, the tip end surface 6a faces in the direction of the cathode surface 2a of the cathode 2. By operating the position adjuster 7, the gap between the tip end surface 6a and the cathode surface 2a is adjustable at will. By operating the driving mechanism 5, the cathode 2 is rotated so that the anode surface 6a can successively face on different portions of the cathode surface 2a.

Designated as 11 is a source of an inert gas such as helium, argon or nitrogen for feeding the inert gas of a controlled pressure to the chamber 1. A pressure gauge 13 is connected to the chamber 1 for measuring the inside pressure of the chamber 1. Designated as 10 is an evacuator.

A scraping member 8 is disposed within the chamber 1 for scraping carbonaceous deposits formed on the surface of the cathode surface 2a. The scraping member 8 in the illustrated embodiment includes a blade whose edge 8a is maintained in contact with the cathode surface 2a.

Figure 3:
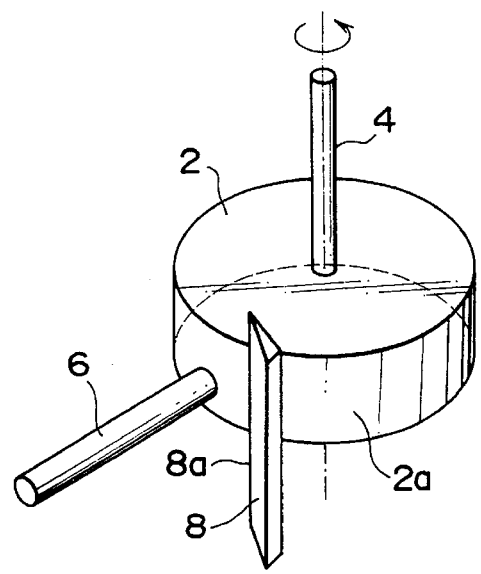
FIGS. 3 and 4 are schematic illustrations, similar to FIG. 2, showing other arrangements.
Figure 4:
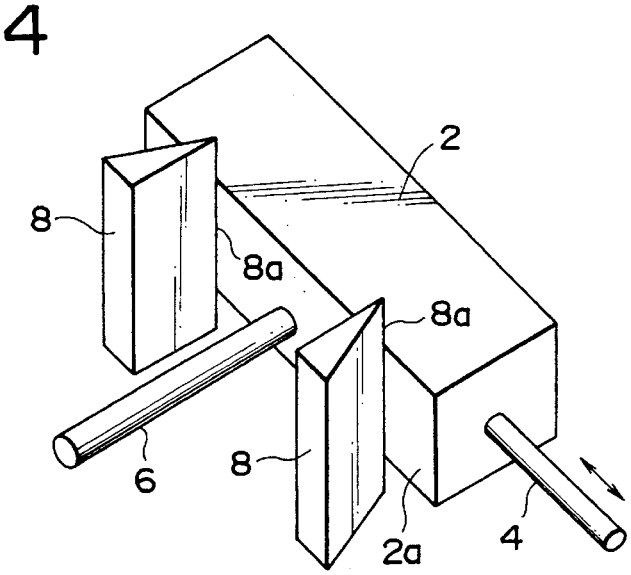

The structure of the cathode may be changed in various manners. In the embodiment shown in FIG. 3, the peripheral surface of the cylindrical cathode 2 provides the cathode surface 2a. The rotational axis of the cathode 2 is oriented normal to that of the anode 6. By rotation of the cathode 2, the tip end surface 6a of the anode successively faces on different portions of the cathode surface 2a. In an alternative embodiment shown in FIG. 4, the cathode 2 is reciprocally displaced in the direction normal to the axis of the anode 6 and the cathode surface 2a extends in the direction parallel with the reciprocating direction. If desired, the displacement of the tip end surface 6a of the anode 6 relative to the cathode surface 2a in the foregoing embodiments may be performed manually.

While, in the foregoing embodiments, the cathode 2 is movably constructed, it is possible to stationarily fix the cathode 2 within the chamber 1 with the anode 6 being arranged to be moved not only in the axial direction but also in parallel with the cathode surface 2a. However, since it is also necessary to move the scraping member 8 and parts associated with the anode 6, the structure becomes more complicated as compared with the foregoing embodiments.

A method of producing fullerenes using the device of FIG. 1 will be now described.

In starting up, the anode 6 is displaced to bring the tip end surface 6a into contact with the cathode surface 2a. The evacuator 10 is operated to reduce the pressure within the chamber 1 to 0.1–760 Torr, preferably 1–20 Tort and, then, the direct current voltage source 10 is connected to the anode 6 and the cathode 2 to heat them while continuing the evacuation. By this pretreatment, oxygen and moisture entrapped in respective parts within the chamber are withdrawn therefrom.

Helium gas is then fed from the source 11 to the chamber 1 and the helium gas pressure is maintained at 10–760 Torr, preferably at 50–150 Torr. Thereafter, the position adjuster 7 is operated to adjust the distance between the tip end surface 6a and the anode surface 2a to generally 0.1–5 mm, preferably 1–3 mm, while impressing the direct current voltage of generally 20–40 V, preferably 25–30 V therebetween, so that an arc discharge occurs with the simultaneous deposition of a carbonaceous material containing carbon nanotubes on that portion of the cathode surface 2a which is adjacent to the tip end surface 6a of the anode 6. The DC current in this case is controlled to 10–100 W/mm$^2$, preferably 30–70 W/mm$^2$. As a result, an arc discharge occurs between the anode and cathode to produce soot containing fullerenes.

While continuing the arc discharge, the driving mechanism 5 is continuously or intermittently operated to rotate the cathode 2 and to change the relative position between the tip end surface 6a and the cathode surface 2a. The rotational speed may be such that the average running speed of the tip end surface 6a relative to the cathode surface 2a ranges from 60 to 300 mm/minute. During the rotation of the cathode 2, the carbonaceous deposits are scraped by the blade 8 and collected in the bottom of the chamber so that the arc discharge can smoothly continue. The distance between the cathode surface 2a and the tip end surface 6a is also controlled in the above range since the anode is consumed as the arc discharge proceeds.

After the anode 6 has been consumed, the feed of the DC current is stopped. Then, the soot accumulated in the chamber 1 is collected to recover the fullerenes contained therein.

Referring again to FIG. 1, designated as 20 is a cooler disposed within the chamber 1. The cooler 20 may be in the form of a pipe or a panel preferably having a large cooling surface area. A cooling medium such as water is fed through a recirculating line 21 to the cooler 20. Because of the presence of the cooler 20, the soot produced by the arc discharge is preferentially accumulated on the cooled surfaces of the cooler 20.

Inert gas blowing pipes 23 are disposed in the chamber 1 to fluidize the soot accumulated in the chamber 1. The pipes 23 have a multiplicity of holes 25 through which an inert gas introduced from an inert gas source 24 through lines 22 is injected towards the walls of the chamber 1 and the cooled surfaces of the cooler 20 on which soot has been accumulated. Thus, the soot is liberated from the walls and cooled surfaces and is fluidized. The inert gas may be, for example, nitrogen or argon.

Designated as 27 and 28 are vessels each containing a solvent, such as toluene or benzene, capable of dissolving fullerenes. A discharge conduit 26 extends between the chamber 1 and the upstream vessel 27 so that the fluidized soot is discharged from the chamber 1 together with the inert gas and introduced into the solvent within the vessel 27. The gas phase after the contact with the solvent which may contain entrained soot is withdrawn overhead from the vessel 27 and is introduced into the downstream vessel 28 where the gas is again contacted with the solvent. The gas from the vessel 28 is, if desired, recycled to the line 22. The solvent into which the fullerenes are dissolved is discharged from each of the vessels 27 and 28 and is fed to a solid-liquid separator 32, such as a filtration device, to recover an extract containing the fullerenes. In FIG. 1, designated as 29, 33 and 34 are open/close valves, as 30 is a filter for removing entrained soot and as 31 is a pump.

The following example will further illustrate the present invention.

EXAMPLE

Fullerenes were produced using the device shown in FIG. 1. Meandering stainless steel pipes 20 were disposed within a chamber 1 and connected to a water source through a valve, stainless steel pipes 23 having an inside diameter of 4 mm and provided with a plurality of holes 25 with a diameter of 2 mm were mounted in the chamber 1. Each of the pipes 23 was connected to a nitrogen gas source 24 through a valve 33 or 34. The chamber 1 was connected in series to vessels 27 and 28 each containing toluene. A graphite rod having a diameter of 15 mm was used as the anode 6 while a cylindrical graphite rod having a diameter of 65 mm was used as the cathode 2. The anode 6 and the cathode 2 were disposed within the chamber so that the axis of the anode 6 was spaced apart by a distance of 25 mm from the axis of the cathode 2. After locating the anode 6 in abutting engagement with the cathode 2, the chamber 1 was evacuated. While maintaining the chamber 1 at a pressure of about 1 Torr, a DC current was allowed to flow through the anode 6 and cathode 2 for 3 hours to heat the anode 6 and cathode 2 and to remove oxygen and moisture. Then, cooling water was fed to the pipe 20. A helium gas was continuously fed to the chamber 1 at a rate of 5 liters per minute under a pressure of 100 Torr. The anode 6 was slightly retracted to form a gap of 1.5–2 mm between the tip end surface 6a and the cathode surface 2a, so that arc discharge occurred. The electrical current was maintained at 300 A and the gap between the anode and the cathode was maintained at 1.5–2 mm. Thus, soot containing fullerenes was produced and accumulated on the pipes 20. During the arc discharge, the cathode 2 was rotated at a rate of about 10 revolutions per minute. Thus, the carbonaceous material deposits formed on the cathode surface 2a were continuously scraped with the blade 8 and collected in the bottom of the chamber 1.

The feed of DC current was stopped when the anode 6 was consumed. Then, the feed of cooling water to the pipes 20 was stopped and the valves 33 and 34 were opened to feed the nitrogen gas into the pipes 23. The nitrogen gas was injected through the openings 25 toward the pipes 20 on which soot had been accumulated. Thus, the soot was fluidized, discharged from the chamber 1 and introduced into the vessels 27 and 28. The fullerene-containing toluene in each of the vessels 27 and 28 was recovered and concentrated to dryness to obtain 1.5 g of fullerenes. This amount corresponds to about 12% of the total soot produced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of producing fullerenes, comprising the steps of:

(a) disposing an axially extending carbonaceous anode having a tip end surface and a cathode having a cathode surface in an airtight chamber such that said tip end surface faces on said cathode surface;

(b) introducing a first supply of inert gas into said airtight chamber to establish an atmosphere of a first inert gas therein;

(c) impressing a direct current voltage between said anode and said cathode while maintaining said chamber in the atmosphere of the first inert gas to cause an arc discharge to occur therebetween, so that soot containing fullerenes is accumulated in said chamber;

(d) then, after termination of step (c), blowing a second supply of inert gas on said accumulated soot to fluidize same;

(e) discharging said fluidized soot from said chamber; and (f) introducing said discharged soot into a liquid containing a solvent capable of dissolving fullerenes, to thereby recover the fullerenes.

2. A method as set forth in claim 1, wherein said cathode surface has an area greater than that of said tip end surface and wherein step (c) is performed while positioning said tip end surface to successively face on different portions of said cathode surface while keeping the distance therebetween substantially unchanged and while keeping the axis of said anode oriented in the direction normal to each of said portions of said cathode surface.

3. A method as set forth in claim 1 wherein the soot containing fullerenes is deposited on a surface of said cathode and further comprising removing the deposited soot from said surface of said cathode and accumulating the removed soot in the bottom of the airtight chamber.

4. A method as set forth in claim 4 further comprising rotating the cathode about an axis parallel to the central axis of said anode, with said cathode presenting a flat surface normal to the axis of the anode for deposit of the soot thereon.

5. A method as set forth in claim 3 further comprising rotating said cathode and wherein said cathode is a cylindrical member rotated about an axis normal to the axis of the anode, thus presenting a cylindrical surface facing the anode for deposition of soot thereon.

6. A method as set forth in claim 3 wherein said removing is by scraping.

7. A method as set forth in claim 3 further comprising reciprocating said cathode with said surface of said cathode moving in a plane normal to the axis of said anode.

8. A device for producing fullerenes, comprising:

an airtight chamber;

an axially extending carbonaceous anode rod having a tip end surface;

a cathode having a cathode surface facing said tip end surface;

means for feeding a first supply of inert gas to said chamber;

means for supporting said cathode such that said cathode surface is positioned within said chamber;

means for supporting said anode rod such that said tip end surface is positioned within said chamber and faces said cathode surface with the axis of said anode rod being oriented in the direction normal to said cathode surface;

control means for controlling the distance between said tip end surface and said cathode surface;

means for impressing a direct current voltage between said anode rod and said cathode, so that an arc discharge occurs between said tip end surface of said anode rod upon impression of the direct current voltage therebetween and soot containing fullerenes is accumulated in said chamber;

cooling means for cooling a surface within said chamber so that said soot is deposited on said cooled surface during said arc discharge;

blowing means for blowing a second supply inert gas on the soot deposited on said cooled surface to fluidize said soot, said blowing means including a plurality of injection ports for injecting said second inert gas toward said cooled surface;

a recovery zone containing a solvent capable of dissolving fullerenes; and means extending between said chamber and said recovery zone to introduce said fluidized soot into said solvent, whereby said fullerenes contained in said soot are recovered in said solvent.

9. A device as claimed in claim 8, wherein said cathode includes an electrically conductive columnar body having a circular cross-section, said columnar body having one end which has an area greater than that of said tip end and which provides said cathode surface and a second end which is fixed to a coaxially extending, electrically insulated shaft, wherein said means for supporting said cathode includes a support member fixed within said chamber and having a hole in which said columnar body of said cathode is rotatably received such that the axis of said columnar body serves as the center of rotation of said columnar body, wherein said means for supporting said anode rod includes a holder holding said anode rod such that the axis of said anode rod is oriented in parallel to, but non-aligned with, the axis of said columnar body, and wherein said control means includes drive means connected to said holder for shifting said holder in a direction parallel to the axis of said anode rod, said device further comprising drive means connected to said shaft for rotating said shaft about the axis thereof.

10. A device as claimed in claim 8 wherein said blowing means further includes an additional plurality of injection ports for injecting said second inert gas into soot accumulated in the bottom of said airtight chamber.

11. A device as claimed in claim 8 wherein said cathode is a cylindrical member and said cathode surface is a flat surface normal to the axis of said anode, said device further comprising means for rotating said cathode with said cathode surface rotating within a plane normal to the axis of said anode.

12. A device as claimed in claim 11 further comprising removal means for removing the deposit of soot formed on said cathode surface.

13. A device as claimed in claim 12 wherein said removal means is a stationary scraper.

* * * * *

UNITED STATES PATENT AND TRADEMARK OFFICE
CERTIFICATE OF CORRECTION

PATENT NO. : 5,587,141
DATED : December 24, 1996
INVENTOR(S) : OHSHIMA et al

It is certified that error appears in the above-indentified patent and that said Letters Patent is hereby corrected as shown below:

Col. 3, line 60, "Tort" should read --Torr--.

Col. 5, line 2, "stainless" should read --Stainless--.

Col. 6, line 20, "4" should read --3--.

Signed and Sealed this

Twenty-third Day of September, 1997

Attest:

BRUCE LEHMAN

Attesting Officer

Commissioner of Patents and Trademarks